（12) United States Patent
Kobayashi et al.

(10) Patent No.: US 7,322,179 B2
(45) Date of Patent: Jan. 29, 2008

(54) AIR INTAKE AND METHOD FOR BREATHING AIR USING AN AIR INTAKE

(75) Inventors: Hiroaki Kobayashi, Chofu (JP);
Nobuhiro Tanatsugu, Chofu (JP);
Tetsuya Sato, Chofu (JP); Takayuki Kojima, Chofu (JP); Yusuke Maru, Sagamihara (JP)

(73) Assignee: Japan Aerospace Exploration Agency, Tokyo (JP)

( * ) Notice: Subject to any disclaimer, the term of this patent is extended or adjusted under 35 U.S.C. 154(b) by 848 days.

(21) Appl. No.: 10/759,014

(22) Filed: Jan. 20, 2004

(65) Prior Publication Data
US 2004/0144077 A1 Jul. 29, 2004

(30) Foreign Application Priority Data
Jan. 24, 2003 (JP) ............... 2003-016096

(51) Int. Cl.
*B64G 1/40* (2006.01)
*B64D 33/02* (2006.01)

(52) U.S. Cl. .............. 60/204; 60/204; 244/53 B; 137/15.2

(58) Field of Classification Search .......... 60/204, 60/768; 244/53 B; 137/15.1, 15.2
See application file for complete search history.

(56) References Cited

U.S. PATENT DOCUMENTS

| 2,934,893 | A | * | 5/1960 | Streeter | ............ 137/15.1 |
| 3,067,573 | A | * | 12/1962 | Connors | ............ 138/46 |
| 3,131,534 | A | * | 5/1964 | Taylor et al. | ............ 138/46 |
| 3,374,631 | A | * | 3/1968 | Marks | ............ 60/244 |
| 4,007,891 | A | | 2/1977 | Sorensen et al. | |
| 4,502,651 | A | | 3/1985 | Jungclaus et al. | |
| 5,301,901 | A | | 4/1994 | Kutschenreuter, Jr. | |

FOREIGN PATENT DOCUMENTS

FR 2 533 969 4/1984

OTHER PUBLICATIONS

Norman E. Sorensen et al.; "Study of a Family of Supersonic Inlet Systems"; J. Aircraft; May-Jun. 1969; vol. 6, No. 3; pp. 184-189.
Michael K. Smart et al.; "March 4 Performance of a Fixed-Geometry Hypersonic Inlet with Rectangular-to-Elliptical Shape Transition"; AIAA Aerospace Sciences Meeting and Exhibit; Jan. 6-9, 2003; pp. 1, 3, 5, 7, 9 and 11.
Ge-Cheng Zha et al.; "Numerical Simulation of High-Speed Civil Transmport Inlet Operability with Angle of Attack"; AIAA Journal; vol. 36, No. 7; Jul. 1998; pp. 1223-1229.
Joseph F. Wasserbauer et al.; "Design of a Very-Low-Bleed Mach 2.5 Mixed-Compression Inlet with 45 Percent Intenal Contraction"; Nasa Scientific and Technical Publications; 1975; pp. 1-69.

* cited by examiner

*Primary Examiner*—Charles G Freay
(74) *Attorney, Agent, or Firm*—Oliff & Berridge, PLC

(57) ABSTRACT

An air intake includes a spike and a cylindrical cowl. The spike is composed of a plurality of plates which are arranged axial symmetrically around a central axis thereof, and the cowl includes an inner wall parallel to the central axis and is formed so as to enclose a rear portion of the spike via a given space. The adjacent ones of the plates form respective aerodynamic compressive surfaces in spaces formed by the adjacent ones. The distances between the adjacent ones of the plates are variable, and the distance between the forefront of the spike along the central axis and the cowl is variable.

20 Claims, 4 Drawing Sheets

RELATED ART

AIR INTAKE AND METHOD FOR BREATHING AIR USING AN AIR INTAKE

BACKGROUND OF THE INVENTION

1. Field of the Invention

This invention relates to an air intake and a method for breathing air using the air intake which are preferably employed in aerospace industry.

2. Description of the Related Art

An air intake is an important constituent element to affect on the engine performance of a supersonic air-breathing engine or the like because the air intake deaccelerates and compresses the air inflow introduced therein. The air intake can be classified as an internal compression type air intake, an external compression type air intake or a mixed compression type air intake. Particularly, the mixed compression type air intake is balanced because the air intake can exhibit intermediate features, in comparison with the internal compression type air intake and the external compression type air intake.

FIG. 1 is a cross sectional view schematically illustrating the structure of a conventional mixed compression type air intake, and FIG. 2 is an enlarged perspective view illustrating the forefront of the air intake illustrated in FIG. 1. As is apparent from FIGS. 1 and 2, the air intake 10 includes a center structural body 11 called as a "spike" and a cowl 12 provided so as to enclose the rear portion of the spike 11 via a space 13. The spike 11 is formed axial symmetrically, and has a porous wall 14 at the side thereof.

If the air intake 10 is installed in a supersonic air breathing engine, it can generate a shock wave from an air inflow introduced therein through the impact with the forefront 11A of the spike 11. In this case, the air inflow is partially leaked as a spillage flow outside from the space 13 formed by the spike 11 and the cowl 12, so that the capture flow ratio of the air inflow may be decreased. Since the shock wave tends to be receded from the cowl rip 12A as the velocity of the air inflow is decreased, the capture flow ratio of the air inflow is also decreased when the velocity of the air inflow is decreased below the designed velocity range of air inflow of the air intake 10.

Moreover, the shock wave is introduced directly into the space 13 as the velocity of the air inflow is increased, generating a flow field with a strong inversive pressure gradient in the air intake 10. In this case, a boundary layer, which is composed of a flow flux with a relatively low flow velocity and formed nearby the inner walls of the spike 11 and the cowl 12, may be destroyed, and the air flow may be shut off from the air intake 10. As a result, it may be that the air intake 10 can not be started. In this point of view, with the air intake 10 illustrated in FIGS. 1 and 2, since the porous wall 14 is partially provided at the side of the spike 11, the boundary layer is released into an air bleeding path 15 via the porous wall 14, and then, released outside from the air intake 10 through the air bleeding path 15. In this case, however, since the air inflow is partially released outside from the air intake 10, in consequence, the capture flow ratio of the air inflow is decreased.

SUMMERY OF THE INVENTION

It is an object of the present invention, in this point of view, to inhibit the reduction in capture flow ratio of the air inflow introduced into the air intake.

In order to achieve the above-mentioned objects, this invention relates to an air intake including:

a spike including a plurality of plates which are arranged axial symmetrically around a central axis thereof, and a cylindrical cowl having an inner wall parallel to the central axis and provided so as to enclose a rear portion of the spike via a given space, wherein adjacent ones of the plates form respective aerodynamic compressive surfaces in spaces formed by the adjacent ones, and the distances between the adjacent ones of the plates are variable, and the distance between a forefront of the spike along the central axis and the cowl is variable.

In the air intake of the present invention, the spike composing the air intake is made of a plurality of plates which are arranged axial symmetrically around the central axis of the air intake so that the main surfaces of the plates are perpendicular to the central axis of the air intake. The distances between the adjacent plates are variable, and the distance between the forefront of the spike along the central axis and the cowl is variable. Moreover, the adjacent plates form respective aerodynamic compressive surfaces.

Therefore, when an air inflow is introduced into the air intake, if the distances between the adjacent plates and/or the distance between the forefront of the spike and the cowl are controlled, an shock wave, which is generated at the forefront of the spike, is introduced into the forefront of the cowl rip along the aerodynamic compressive surfaces. As a result, regardless of the velocity of the air inflow, the air inflow can be introduced into the space formed by the spike and the cowl through the shock wave, and the capture flow ratio of the air inflow can be increased.

According to the present invention, the shock wave can not be introduced directly into the cowl if the distance control is performed as mentioned above, without the structural complication of the air intake such as the formation of a porous wall and/or an air bleeding path. In addition, since the spike is made of plates, the total weight of the air intake can be decreased.

Other features and advantages of the present invention will be described in detail hereinafter. Also, a method for breathing air using the air intake of the present invention will be described hereinafter.

BRIEF DESCRIPTION OF THE DRAWINGS

For better understanding of the present invention, reference is made to the attached drawings, wherein.

DESCRIPTION OF THE PREFERRED EMBODIMENTS

This invention will be described in detail with reference to the accompanying drawings.

Figure 1:
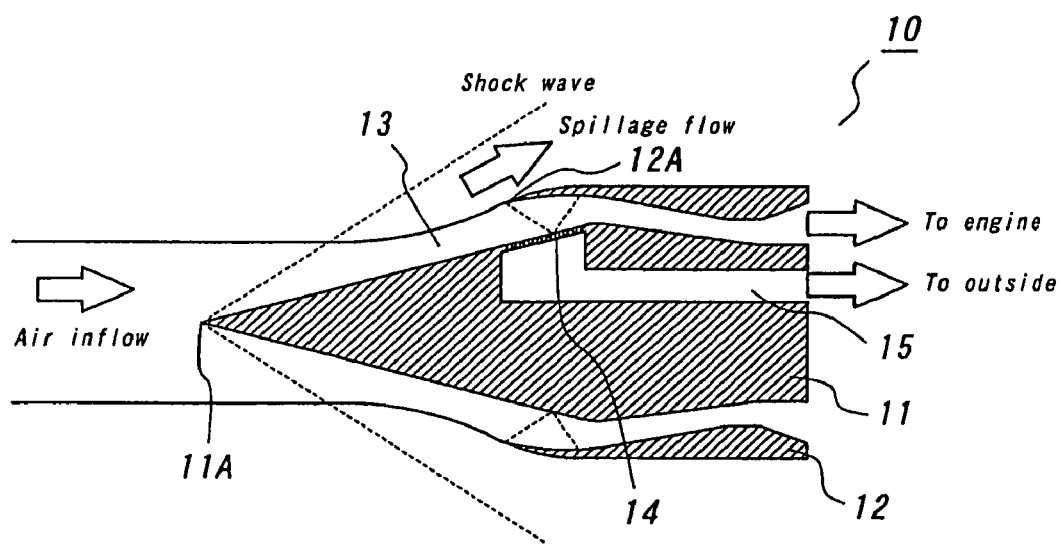
FIG. 1 is a cross sectional view schematically illustrating the structure of a conventional mixed compression type air intake.
Figure 2:
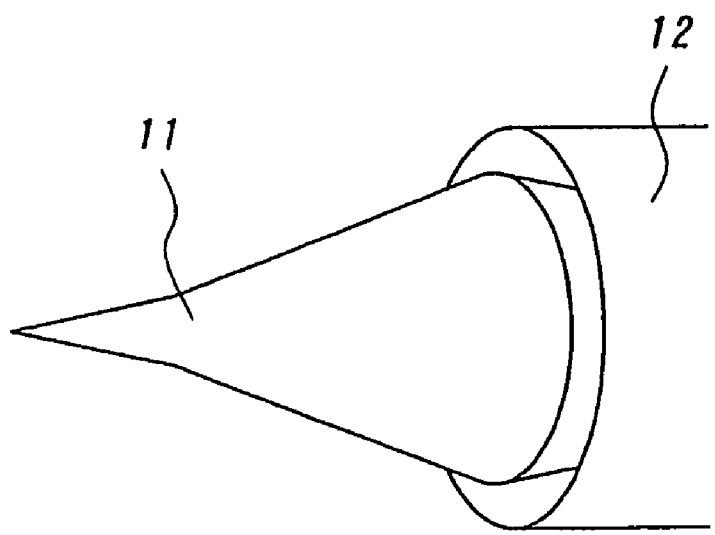
FIG. 2 is an enlarged perspective view illustrating the forefront of the air intake illustrated in FIG. 1.
Figure 3:
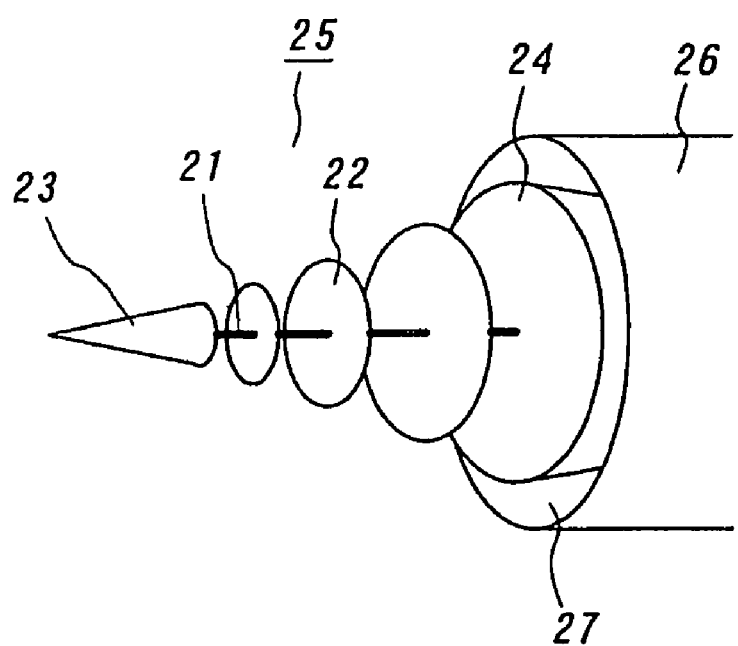
FIG. 3 is an enlarged perspective view illustrating the forefront of an air intake according to the present invention.

FIG. 3 is an enlarged perspective view illustrating the forefront of an air intake according to the present invention.

Figure 4:
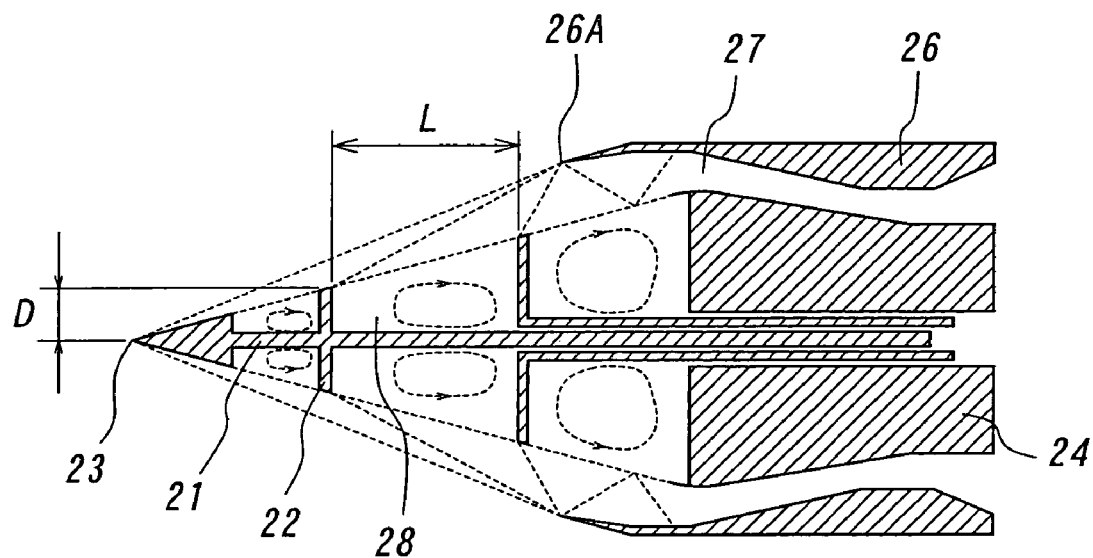
FIG. 4 is an explanatory view relating to the operation of the air intake illustrated in FIG. 3.
Figure 5:
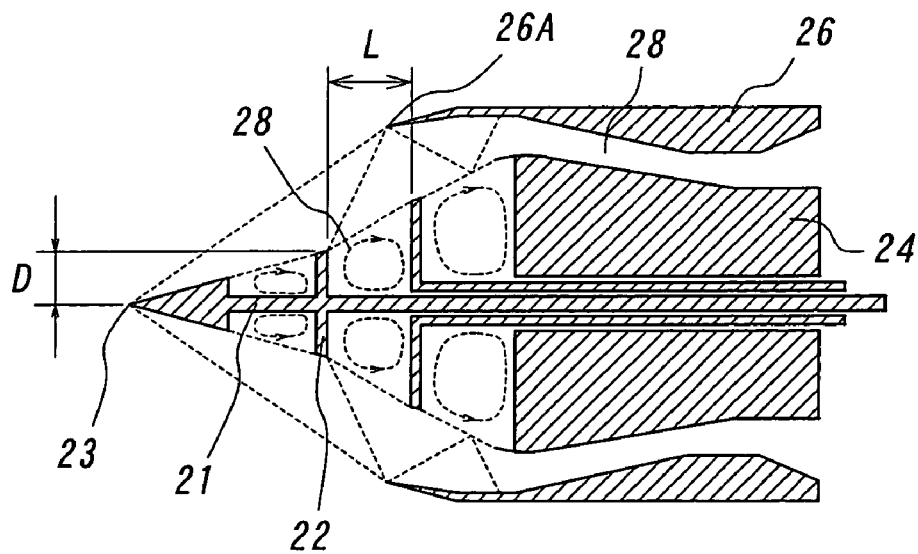
FIG. 5 is another explanatory view relating to the operation of the air intake illustrated in FIG. 3.

FIGS. 4 and 5 are explanatory views relating to the operation of the air intake illustrated in FIG. 3.

An air intake 20 illustrated in FIG. 3 includes a spike 25 composing of a plurality of circular plates 22 which are arranged axial symmetrically around a central axis 21 so that the main surfaces of the circular plates 22 are perpendicular to the central axis 21. The spike 25 also includes a steeple 23 and a base 24 to fix the central axis thereto. A cowl 26 is provided so as to enclose the base 24 of the spike 25 via a space 27.

The surface areas of the circular plates 22 are successively increased toward the base 24 from the steeple 23, and the adjacent ones of the circular plates 22 form aerodynamic compressive surfaces in spaces 28. The distances between the adjacent plates 22 are variable and the distance between the forefront of the steeple 23 and the cowl 26 is variable.

Figure 6:
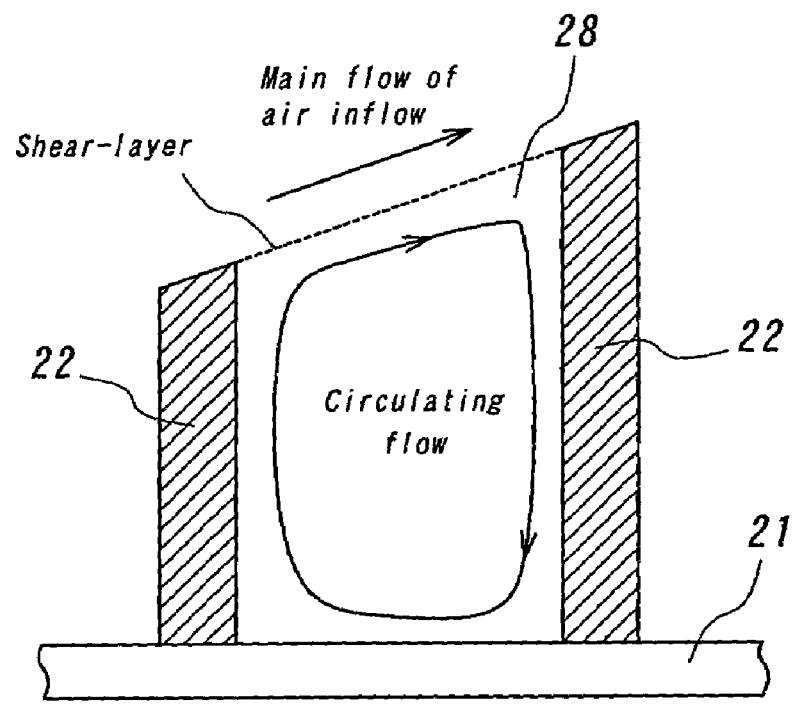
FIG. 6 is an explanatory view relating to the flow condition between the adjacent plates composing the spike of the air intake illustrated in FIG. 3.

Herein, the phrase "the formation of the aerodynamic compressive surfaces" means the condition that in the spaces 28, shear-layers are formed between respective circular flows and respective main flows of the air inflow introduced into the air intake 10 as illustrated in FIG. 6. The shear-layers functions as solid walls for the air inflow to guide the air inflow to the cowl rip as described below.

When the air inflow is introduced into the air intake 20 on the condition that the velocity of the air inflow is larger than the designed velocity of air inflow of the air intake 20, as illustrated in FIG. 4, the distances between the adjacent circular plates 22, that is, the widths L of the spaces 28 formed by the adjacent circular plates 22 are increased, and the distance between the forefront of the steeple 23 and the cowl 26 is increased to slenderize the spike 25. In this case, the air inflow is impacted with the steeple 23 or the edges of the circular plates 22 to form a shock wave to be introduced into the cowl rip 26A. Therefore, the spillage of the air inflow can be weakened and the capture flow ratio of the air inflow can be increased.

If the distances between the adjacent circular plates 22 and the distance between the forefront of the steeple 23 and the cowl 26 are controlled appropriately, the shock wave can not be introduced directly into the space 27, that is, the cowl 26. In this case, therefore, the air intake 20 can be started under good condition. In the present invention, it is not required to provide an additional porous wall at the side of the spike 25 and an additional air bleeding path at the spike 25, so that the total structure of the air intake 20 can be simplified.

On the other hand, when the air inflow is introduced into the air intake 20 on the condition that the velocity of the air inflow is smaller than the designed velocity of air inflow of the air intake 20, as illustrated in FIG. 5, the distances between the adjacent circular plates 22, that is, the widths L of the spaces 28 formed by the adjacent circular plates 22 are decreased, and the distance between the forefront of the steeple 23 and the cowl 26 is decreased to shorten the spike 25. In this case, the air inflow is impacted with the steeple 23 or the edges of the circular plates 22 to form a shock wave to be introduced into the cowl rip 26A. Therefore, the spillage of the air inflow can be weakened and the capture flow ratio of the air inflow can be increased.

As mentioned above, in the air intake 20 according to the present invention, regardless of the velocity of the air inflow to be introduced into the air intake 20, the capture flow ratio of the air inflow can be increased only if the distances between the adjacent circular plates 22 and the distance between the forefront of the steeple 23 and the cowl 26 are controlled appropriately.

It is desired that the relation of $L/D \leq 1$ is satisfied if the depth of each space 28 formed by the adjacent circular plates 22 is defined as "D" and the width of each space 28 along the central axis 21 is defined as "L". In the air intake 20, since the spike 25 is composed of circular plates 22, if the air inflow is impacted to the edges of the circular plates 22 to generate a shock wave, the (total) pressure loss of the air inflow may occur due to the shock wave. If the above relation of $L/D \leq 1$ is satisfied, however, the shock wave can be weakened even though the air inflow is impacted to the edges of the circular plates 22, so that the pressure loss of the air inflow due to the shock wave can be reduced.

Preferably, the L/D is set to about 0.5. In this case, the shock wave can be almost perfectly weakened at the edges of the circular plates 22, and thus, the pressure loss of the air inflow due to the shock wave can be almost perfectly reduced.

Figure 7:
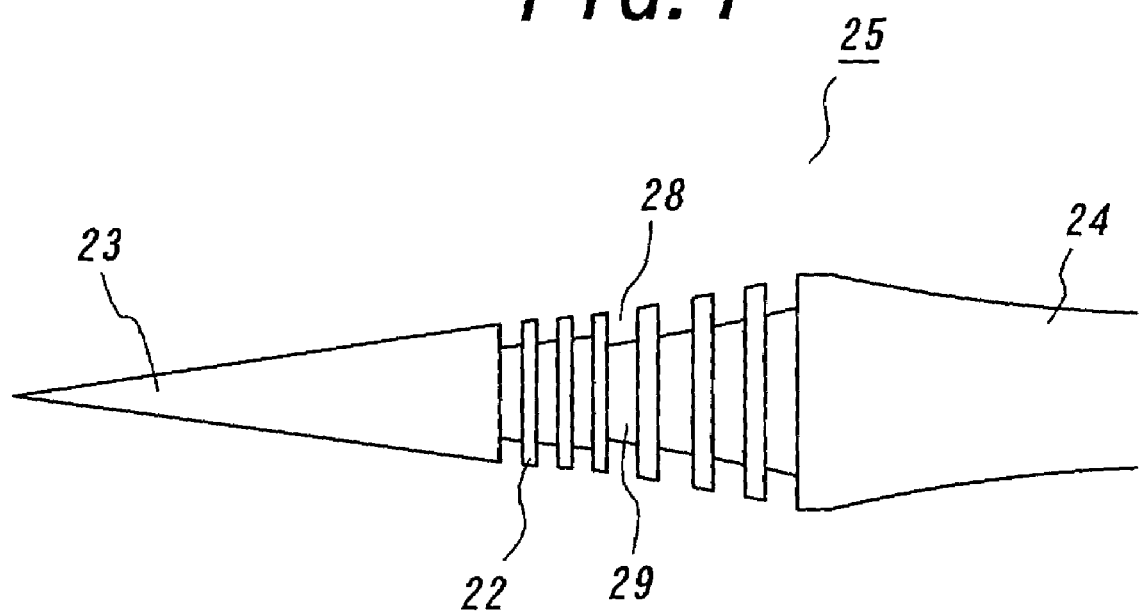
FIG. 7 is an enlarged side view illustrating the forefront of another air intake modified from the one illustrated in FIG. 3.

FIG. 7 is an enlarged side view illustrating the forefront of another air intake modified from the one illustrated in FIG. 3. In an air intake 25 illustrated in FIG. 7, the adjacent circular plates 22 are separated by respective spacers 29. In this case, the spaces 28 between the adjacent circular plates 22 are defined by the thicknesses of the spacers 29, and if the thicknesses of the spacers 29 are controlled appropriately, the degree of freedom of the L/D can be increased.

Although the present invention was described in detail with reference to the above examples, this invention is not limited to the above disclosure and every kind of variation and modification may be made without departing from the scope of the present invention.

In FIG. 3, for example, although the circular plates 22 are provided outside from the cowl 26, some of the circular plates 22 may be provided so as to be enclosed by the cowl 26. In this case, however, it may be that the shock wave can not be introduced into the cowl rip 26A, and thus, the capture flow ratio of the air inflow is decreased. Moreover, although the spike 25 is composed of the circular plates 22, the spike 25 may be composed of another shaped plates only if the requirements according to the present invention are satisfied.

As mentioned above, according to the present invention can be provided an air intake and an air breathing method using the air intake, whereby the capture flow ratio of an air inflow to be introduced into the air intake can be increased.

What is claimed is:

1. An air intake comprising:
   a spike including a plurality of plates which are arranged axial symmetrically around a central axis thereof, and
   a cylindrical cowl having an inner wall concentric to said central axis and provided so as to enclose a rear portion of said spike via a given space,
   wherein adjacent ones of said plates form respective aerodynamic compressive surfaces in spaces formed by said adjacent ones, and the distances between said adjacent ones of said plates are variable, and the distance between a forefront of said spike along said central axis and said cowl is variable.

2. The air intake as defined in claim 1, wherein the surface areas of said plates are successively increased toward said cowl from said forefront of said spike.

3. The air intake as defined in claim 1, wherein when an air inflow is introduced into said air intake on the condition that the velocity of said air inflow is larger than a designed velocity of air inflow of said air intake, the distances between said adjacent ones of said plates are increased and the distance between said forefront of said spike and said cowl is increased.

4. The air intake as defined in claim 1, wherein when an air inflow is introduced into said air intake on the condition that the velocity of said air inflow is smaller than a designed velocity of air inflow of said air intake, the distances between said adjacent ones of said plates are decreased and the distance between said forefront of said spike and said cowl is decreased.

5. The air intake as defined in claim 1, wherein the relation of $L/D \leq 1$ is satisfied if the depth and the width along said central axis of said spike of a space formed by said adjacent ones of said plates are defined as "D" and "W", respectively.

6. The air intake as defined in claim 5, wherein said L/D is set to 0.5 so that the pressure loss of said air inflow can be weakened.

7. The air intake as defined in claim 1, further comprising spacers between said adjacent ones of said plates of said spike.

8. The air intake as defined in claim 1, wherein said plates are provided outside from said cowl.

9. The air intake as defined in claim 1, further comprising a conical member at said forefront of said spike.

10. The air intake as defined in claim 1, wherein said plates are circular plates.

11. A method for breathing air using an air intake, comprising the steps of:
    forming a spike composing of a plurality of plates which are arranged axial symmetrically around a central axis thereof and of which adjacent ones form respective aerodynamic compressive surfaces in spaces formed by said adjacent ones,
    forming a cylindrical cowl having an inner wall concentric to said central axis and provided so as to enclose a rear portion of said spike via a given space,
    controlling the distances between said adjacent ones of said plates, and
    controlling the distance between a forefront of said spike along said central axis and said cowl.

12. The breathing method as defined in claim 11, wherein the surface areas of said plates are successively increased toward said cowl from said forefront of said spike.

13. The breathing method as defined in claim 11, wherein when an air inflow is introduced into said air intake on the condition that the velocity of said air inflow is larger than a designed velocity of air inflow of said air intake, the distances between said adjacent ones of said plates are increased and the distance between said forefront of said spike and said cowl is increased.

14. The breathing method as defined in claim 11, wherein when an air inflow is introduced into said air intake on the condition that the velocity of said air inflow is smaller than a designed velocity of air inflow of said air intake, the distances between said adjacent ones of said plates are decreased and the distance between said forefront of said spike and said cowl is decreased.

15. The breathing method as defined in claim 11, wherein the relation of $L/D \leq 1$ is satisfied if the depth and the width along said central axis of said spike of a space formed by said adjacent ones of said plates are defined as "D" and "W", respectively.

16. The breathing method as defined in claim 15, wherein said L/D is set to 0.5 so that the pressure loss of said air inflow can be weakened.

17. The breathing method as defined in claim 11, further comprising the step of forming spacers between said adjacent ones of said plates to control said L/D.

18. The breathing method as defined in claim 11, wherein said plates are provided outside from said cowl.

19. The breathing method as defined in claim 11, further comprising the step of forming a conical member at said forefront of said spike.

20. The breathing method as defined in claim 11, wherein said plates are circular plates.

* * * * *